United States Patent [19]
Narayanan et al.

[11] 3,907,822
[45] Sept. 23, 1975

[54] ANTI-INFLAMMATORY (2-BENZIMIDAZOYLTHIO)AL-KYLAMIDOXIMES

[75] Inventors: Venkatachala L. Narayanan, Hightstown; Rudiger D. Haugwitz, Titusville, both of N.J.

[73] Assignee: E. R. Squibb & Sons, Inc., Princeton, N.J.

[22] Filed: June 11, 1973

[21] Appl. No.: 369,044

[52] U.S. Cl.............................. 260/309.2; 424/273
[51] Int. Cl.² .................. A61K 27/00; C07D 49/38
[58] Field of Search................................. 260/309.2

[56] References Cited
UNITED STATES PATENTS
3,558,775  1/1971  Fournier .............................. 424/232
3,673,188  6/1972  Harsanyi et al. ................. 260/288 R Primary Examiner—Henry R. Jiles
Assistant Examiner—C. M. S. Jaisle
Attorney, Agent, or Firm—Lawrence S. Levinson; Merle J. Smith; Stephen B. Davis

[57] ABSTRACT

Anti-inflammatory (2-benzimidazolylthio)alkylamidoximes and related compounds and their methods of preparation are disclosed. In addition, useful compositions and methods for employing said compositions in the treatment of inflammation are taught.

5 Claims, No Drawings

ANTI-INFLAMMATORY (2-BENZIMIDAZOYLTHIO)ALKYLAMIDOXIMES

This invention relates to compounds of the formula

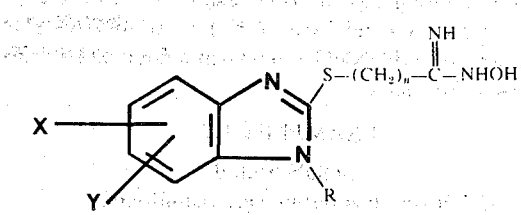

I wherein X and Y are selected from the group consisting of hydrogen, lower alkyl, lower alkoxy, aryl, aryloxy, nitro and halo; R is selected from the group consisting of hydrogen, lower alkyl and aryl and $n$ is an integer from one to six, and acid addition salts thereof.

The preferred compounds of this invention are those wherein X and Y are selected from the group consisting of hydrogen, lower alkyl and nitro, R is selected from the group consisting of hydrogen and lower alkyl and $n$ is an integer from one to three with the most preferred being those wherein X and Y are selected from the group consisting of hydrogen and nitro, R is hydrogen and $n$ is two.

In addition, this invention relates to methods for preparing said compounds, pharmaceutical compositions containing said compounds and methods for using said compositions in the treatment of inflammation.

The term "aryl" is intended to include phenyl, naphthyl, substituted phenyl wherein said substituent may be fluoro, chloro, bromo, iodo, nitro, trifluoromethyl, lower alkyl and lower alkoxy.

The term "lower alkyl" is intended to mean a straight or branched hydrocarbon fragment of from one to eight carbon atoms.

The term "lower alkoxy" is intended to mean a lower alkyl group linked through a single bond to oxygen.

The term "acid addition salts" is intended to mean salts which may be formed for the purpose of isolation, purification and storage, such as the oxalate salt, etc., and pharmaceutically acceptable salts meant for administration of the compound to a host, such as the hydrochloride, sulfate, acetate, citrate, etc.

The compounds of this invention are prepared in the following manner.

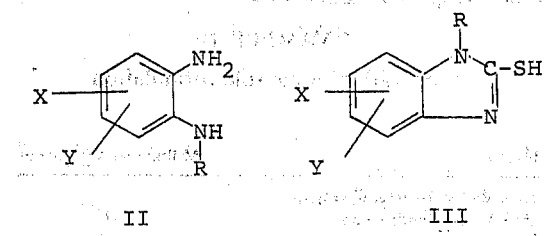

II                III

Mercaptobenzimidazoles of formula III can be prepared by known methods from o-phenylenediamines of formula II by heating with carbon disulfide in alcohol, by the action of thiophosgene in chloroform or by heating with potassium ethyl xanthate (Organic Syntheses, Col. Vol. IV, p. 569 and references therein).

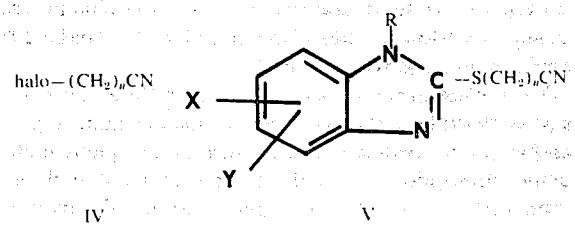

IV                V

Reaction of mercaptobenzimidazoles of formula III with haloalkylnitriles IV in the presence of a base, such as triethylamine, pyridine, sodium carbonate, potassium carbonate, sodium hydroxide or potassium hydroxide, gives cyanoalkylthiobenzimidazoles of formula V.

Generally a 3 to 7 fold excess of compound IV is employed. The reaction is conducted in protic or aprotic solvents, such as lower alkylalcohols, acetone, benzene, toluene, glyme, ether, tetrahydrofuran or ethyl acetate at temperatures of from about 5 to about 150°C, preferably 25° to 100°C for periods of from 0.5 to 24 hours, preferably 3 to 12 hours.

In general, when R is other than hydrogen, larger amounts of a haloalkylnitrile and/or stronger bases, such as sodium hydride or potassium hydride, are employed.

Compound of structure V are converted to amidoximes of structure I by the reaction of a nitrile of formula V with a hydroxyamine salt, such as hydroxylamine hydrochloride in the presence of a base such as sodium or potassium carbonate, in a protic solvent like aqueous lower alkyl alcohol.

The compounds of this invention and their nontoxic pharmaceutically acceptable salts have thus been found to be useful in the treatment of inflammation in mammals when administered in amounts ranging from about 1.2 mg. to about 30 mg. per kg. of body weight per day. A preferred dosage regimen for optimum results would be from about 1.5 mg. to about 15 mg. per kg. of body weight per day, and such dosage units are employed that a total of from about 100 mg. to about 2 g. of active ingredient for a subject of about 70 kg. body weight are administered in a 24 hour period.

The compounds of the present invention in the described dosages are intended to be administered orally; however, other routes such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

2-(2-Benzimidazolylthio)acetamidoxime a. 2-(2-Benzimidazolylthio)acetonitrile

A solution of 30.0 g (0.2 mole) of 2-mercaptobenzimidazole, 20.4 g (0.2 mole) of triethylamine and 15.2 g (0.2 mole) of chloroacetonitrile in 350 ml of dry THF is refluxed for 24 hrs. The reaction mixture is then cooled to room temp. and the triethylamine HCl is removed by filtration and washed with THF. The solvent is removed from the filtrate by distillation in vacuo and the resulting residue is recrystallized from aq. acetone to yield 16.8 g. (44%) of product, mp 160.5–162.5°.

b. 2-(2-Benzimidazolylthio)acetamidoxime.

A solution of 36.8 g (0.20 mole) of 2-(2-benzimidazolylthio)-acetonitrile, 13.9 g. (0.20 mole) of hydroxylamine HCl and 13.8 g. (0.10 mole) of $K_2CO_3$ in 700 ml of ethanol and 70 ml $H_2O$ is refluxed for 20 hrs, followed by cooling to room temp. and the addition of 200 ml of $H_2O$. After removal of the ethanol by distillation in vacuo, the product precipitates out of the aqueous layer. The product is collected by filtration and recrystallized from $H_2O$ to yield 21.8 g. (49%), mp 166° dec.

EXAMPLE 2

2-(5-Nitro-2-benzimidazolylthio)acetamidoxime.

a. 2-(5-Nitro-2-benzimidazolylthio)acetonitrile.

A solution of 78 g (0.4 mole) of 5-nitro-2-mercaptobenzimidazole, 40.8 g (0.4 mole) of triethylamine and 30.4 g (0.4 mole) of chloroacetonitrile in 700 ml of dry THF is refluxed for 24 hrs. The reaction mixture is then cooled to room temp. and the triethylamine HCl is removed by filtration and washed with THF. The solvent is removed from the fitrate by distillation in vacuo and the resulting crude semi-solid residue is stored for future use.

b. 2-(5-Nitro-2-benzimidazolylthio)acetamidoxime.

A solution of 10.0 g. (0.04 mole) of 2-(5-nitro-2-benzimidazolylthio)acetonitrile, 3.0 g. (0.04 mole) of hydroxylamine HCl and 3.0 g. (0.02 mole) of $K_2CO_3$ in 200 ml of ethanol and 20 ml of $H_2O$ is refluxed for 20 hrs. The solvent is then removed by distillation in vacuo and the resulting yellow solid residue is washed with $H_2O$ and dried to yield 7.0 g. (60%) of product. Recrystallization from dil. MeOH yields an analytical sample, mp 184°–185° dec.

EXAMPLES 3–6

2-(Substituted -2-benzimidazolylthio)acetoamidoximes a. 2-(Substituted-benzimidazolylthio)acetonitriles According to the procedure of example 1, part (a), upon substituting in place of 2-mercaptobenzimidazole one of the following compounds:
  5-chloro-2-mercaptobenzimidazole,
  4-methoxy-2-mercaptobenzimidazole,
  6-methyl-2-mercaptobenzimidazole and 1-methyl-6-fluoro-2-mercaptobenzimidazole,
one obtains:
  2-(5-chloro-2-benzimidazolylthio)acetonitrile,
  2-(4-methoxy-2-benzimidazolylthio)acetonitrile,
  2-(6-methyl-2-benzimidazolylthio)acetonitrile and
  2-(1-methyl-6-fluoro-2-benzimidazolylthio)acetonitrile, respectively.

b. 2-Benzimidazolythiolacetoamidoximes

According to the procedure of example 1, part (b), the compounds of this example, part (a), are converted to their respective amidoximes.

EXAMPLES 7–9

2-(2-Benzimidazolylthi)alkylamidoximes a. 2-(2-Benzimidazolylthio)alkylnitriles

According to the procedure of example 1, part (a), upon substituting in place of chloroacetonitrile, one of the following compounds:
  bromopropionitrile,
  iodobutyronitrile and
  5-cyanopentyliodide,
one obtains:
  2-(2-benzimidazolylthio)propionitrile,
  2-(2-benzimidazolylthio)butyronitrile, and
  2-(2-benzimidazolylthio)pentanonitrile.

b. 2-(2-Benzimidazolylthio)alkylamidoximes

According to the procedure of example 1, part (b), the compounds of this example, part (a), are converted to their respective amidoximes.

EXAMPLE 10

Preparation of capsule formulation

| Ingredient | Milligrams per Capsule |
| --- | --- |
| 2-(2-Benzimidazolylthio)-hydrochloride acetamidoxime, | 400 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 11

Preparation of tablet formulation

| Ingredient | Milligrams per Tablet |
| --- | --- |
| 2-(2-Benzimidazolylthio)-acetamidoxime, hydrochloride | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 300 milligrams of active ingredient.

EXAMPLE 12

Preparation of oral syrup formulation

| Ingredient | Amount |
| --- | --- |
| 2-(2-Benzimidazolylthio)-acetamidoxime, hydrochloride | 5000 mg. |
| Sorbitol solution (70% N.F.) | 40 ml. |
| Sodium benzoate | 150 mg. |
| Saccharin | 20 mg. |
| Red Dye (F.D. & C. No. 2) | 10 mg. |
| Cherry flavor | 50 mg. |
| Distilled water qs to | 100 ml. |

The sorbitol solution is added to 40 milliliters of distilled water and the active ingredient is suspended therein. The saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

What is claimed is:

1. A compound of the formula

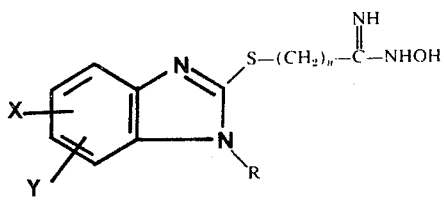

wherein X and Y are selected from the group consisting of hydrogen, lower alkyl, lower alkoxy, nitro, halo, phenyl, naphthyl, phenoxy, naphthyloxy, and substituted phenyl and phenoxy wherein said substituent is fluoro, chloro, bromo, iodo, nitro, trifluoromethyl, lower alkyl, or lower alkoxy; R is selected from the group consisting of hydrogen, lower alkyl, phenyl, naphthyl, and substituted phenyl wherein said substituent is fluoro, chloro, bromo, iodo, nitro, trifluoromethyl, lower alkyl or lower alkoxy; and $n$ is an integer from one to six; and acid addition salts thereof.

2. The compound of claim 1 wherein X and Y are selected from the group consisting of hydrogen, lower alkyl and nitro, R is selected from the group consisting of hydrogen and lower alkyl and $n$ is an integer from one to three.

3. The compound of claim 2 wherein X and Y are selected from the group consisting of hydrogen and nitro, R is hydrogen and $n$ is two.

4. The compound of claim 3 having the name 2-(2-benzimidazolylthio)acetamidoxime and acid addition salts thereof.

5. The compound of claim 3 having the name 2-(5-nitro-2-benzimidazolythio)acetamidoxime and acid addition salts thereof.

* * * * *

UNITED STATES PATENT AND TRADEMARK OFFICE
CERTIFICATE OF CORRECTION

PATENT NO. : 3,907,822
DATED : Sept. 23, 1975
INVENTOR(S) : V. L. Narayanan, R. D. Haugwitz It is certified that error appears in the above-identified patent and that said Letters Patent are hereby corrected as shown below:

In the title, "Benzimidazoylthio" should read
--Benzimidazolylthio--.

Col. 3, line 65, "fitrate" should read --filtrate--.

Col. 4, line 30, "Benzimidazolythiol" should read
--Benzimidazolylthio)--.

Col. 4, line 35, "Benzimidazolylthi" should read
--Benzimidazolylthio--.

Col. 4, line 60, "hydrochloride acetamidoxime" should read
--acetamidoxime hydrochloride--.

Col. 6, line 42, "benzimidazolythio" should read
--benzimidazolylthio--.

Signed and Sealed this seventeenth Day of February 1976

[SEAL]

Attest:

RUTH C. MASON
Attesting Officer

C. MARSHALL DANN
Commissioner of Patents and Trademarks